US 6,861,125 B1

United States Patent
Carlson et al.

(10) Patent No.: US 6,861,125 B1
(45) Date of Patent: Mar. 1, 2005

(54) THERMOFORMABLE FILM LAMINATION CONTAINING A FLEXIBLE POLYAMIDE COEXTRUSION

(75) Inventors: Andrea Maylene Carlson, Oshkosh, WI (US); Gregory Robert Pockat, Ripon, WI (US)

(73) Assignee: Curwood, Inc., Oshkosh, WI (US)

( * ) Notice: Subject to any disclaimer, the term of this patent is extended or adjusted under 35 U.S.C. 154(b) by 39 days.

(21) Appl. No.: 09/837,084

(22) Filed: Apr. 18, 2001

Related U.S. Application Data

(60) Provisional application No. 60/199,674, filed on Apr. 21, 2000.

(51) Int. Cl.$^7$ ......................... B32B 27/08; B32B 27/36; B32B 27/34; B65B 53/00
(52) U.S. Cl. ............... 428/195.1; 428/34.9; 428/476.1; 428/474.4; 428/480; 428/483; 428/516; 428/518
(58) Field of Search .............................. 428/195, 195.1, 428/34.9, 34.1, 474.4, 480, 483, 476.1, 516, 518

(56) References Cited

U.S. PATENT DOCUMENTS

| | | | |
|---|---|---|---|
| 5,366,791 A | | 11/1994 | Carr et al. |
| 5,562,996 A | * | 10/1996 | Kuriu et al. .............. 428/474.4 |
| 5,591,530 A | * | 1/1997 | Warner et al. .............. 428/480 |
| 5,643,659 A | * | 7/1997 | Kobayashi et al. ......... 428/216 |
| 5,755,081 A | | 5/1998 | Rivett et al. |
| 6,040,061 A | * | 3/2000 | Bland et al. ................ 428/480 |
| 6,333,061 B1 | * | 12/2001 | Vadhar ....................... 206/497 |
| 6,346,285 B1 | * | 2/2002 | Ramesh ...................... 383/113 |
| 6,379,812 B1 | * | 4/2002 | Hofmeister et al. ....... 428/34.1 |
| 6,383,583 B1 | * | 5/2002 | Ninomiya et al. .......... 156/164 |
| 6,436,496 B1 | * | 8/2002 | Rackovan et al. ......... 428/34.9 |
| 6,436,547 B1 | * | 8/2002 | Toft et al. ................ 428/474.4 |

* cited by examiner

*Primary Examiner*—Rena Dye
*Assistant Examiner*—Lawrence Ferguson
(74) *Attorney, Agent, or Firm*—Barnes & Thornburg LLP

(57) ABSTRACT

A flexible packaging film construction which includes an outer layer of formable biaxially oriented polyester which is printed on one side and adhered to a flexible polyamide containing coextruded film.

15 Claims, 1 Drawing Sheet

THERMOFORMABLE FILM LAMINATION CONTAINING A FLEXIBLE POLYAMIDE COEXTRUSION

This application claims the benefit of U.S. Provisional Application No. 60/199,674 filed on Apr. 21, 2000.

FIELD AND BACKGROUND OF THE INVENTION

This invention relates generally to a flexible packaging film construction that contains a biaxially oriented polyester film, an adhesive and a flexible polyamide-containing coextruded film. In addition, this invention relates to a package prepared from a biaxially oriented polyester film, an adhesive and a flexible polyamide-containing coextruded film.

It is common practice to package articles such as food products in multilayer films or laminates to protect the packaged product from abuse and exterior contamination. The multilayer films or laminates provide convenient and durable packages for transportation and ultimate sale to the end user.

It is usual to include printed indicia like decorations and text on packaging films. A desirable aspect of a printed package requires the printed image to repeat identically from one package to the next. This requires the printed image and the package dimensions to coincide exactly over many iterations. When this successfully occurs, the print is deemed to be in register. It is convenient to include a dimensionally stable film like biaxially oriented polyester in the construction of a printed package. Such a film resists elongation through the various manufacturing processes used to produce a film construction and finished package. This resistance to elongation greatly benefits registration control.

Certain package styles are created by a technique known as thermoforming. In this instance, the film is shaped into a cavity by softening the film via thermal exposure and drawing the softened film into a mold. This package style is commonly used to contain items like processed meat. Film constructions engineered to accommodate thermoforming do not often include biaxially oriented films. The resistance to elongation of biaxially oriented films makes them especially difficult to thermoform. Beyond the formation of very shallow cavities, thermoformed articles that include biaxially oriented films tend to encounter defects like holes and poor definition of shape. Still, there exists limited use of oriented films in end uses that require the formation of very shallow cavities. These applications profit from the ability to easily and repetitively print the films such that the indicia on the packages are in register. It is desirable to extend the use of biaxially oriented films to include the manufacture of register printed packages with deeper thermoformed cavities.

SUMMARY OF THE INVENTION

This invention offers an improvement in the thermoforming performance of a register printed packaging film. The thermoformability of our packaging film construction that includes a biaxially oriented polyester film is substantially improved by also including a flexible poly amide-containing coextruded film. Simultaneous with the thermoforming improvement, the film offers excellent control of print registration.

The flexible polyamide-containing coextruded film contains at least one semi-crystalline polyamide layer. That layer may include polyamides such as nylon 6, nylon 66, nylon 6,66, and the like. Additionally, it may be prepared from a blend of a semi-crystalline polyamide and an amorphous polyamide. The blend is 80 to 90% by weight of the semi-crystalline polyamide and 10 to 20 by weight of the amorphous polyamide. The coextruded film may also contain first and second flexible polyamide layers that are immediately separated by an oxygen barrier layer. The oxygen barrier layer is preferably comprised of an ethylene vinyl alcohol copolymer.

DETAILED DESCRIPTION OF THE PREFERRED EMBODIMENT

Figure 1:
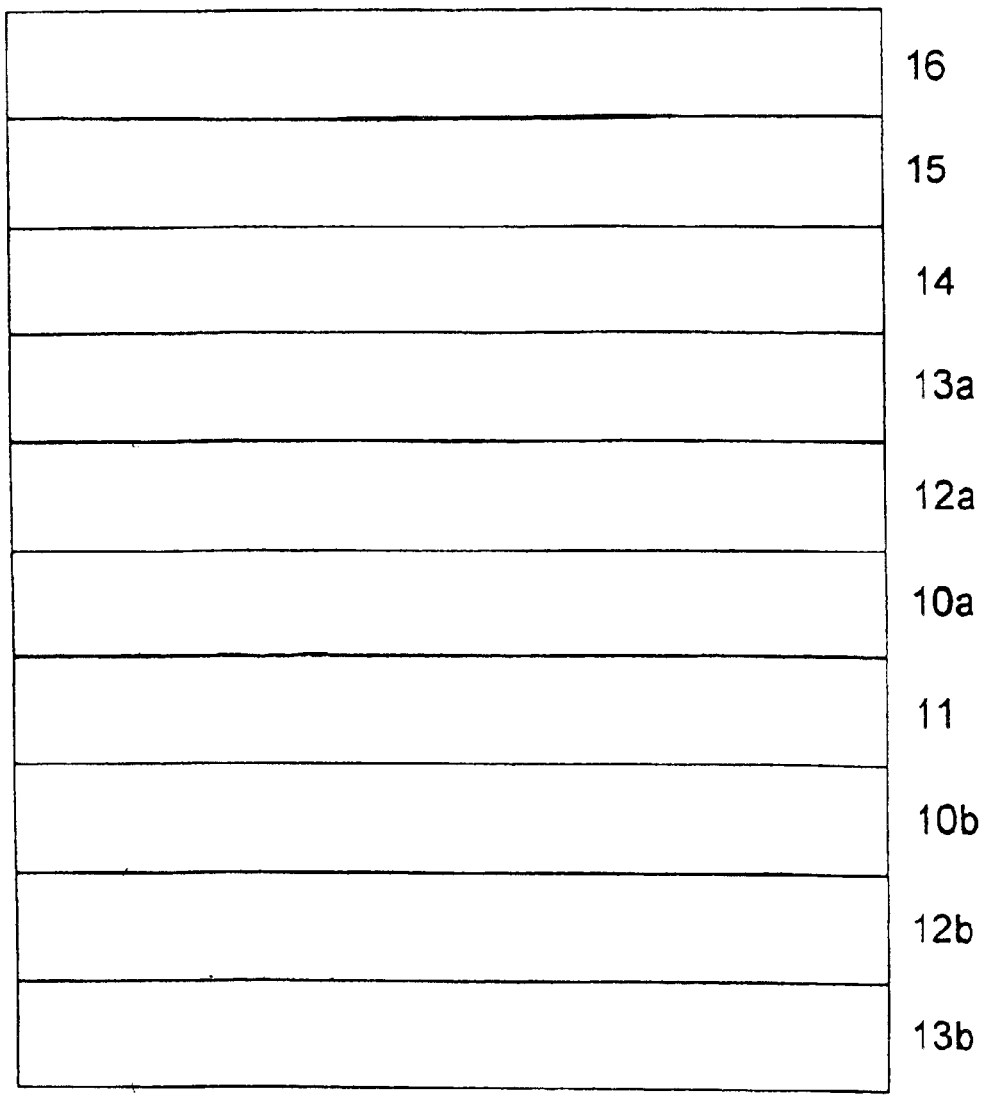
FIG. 1 is a cross-sectional view of a multilayer film assembly of the present invention consisting of a biaxially oriented polyester film layer, an ink layer, an adhesive layer and a sequence of layers formed from a flexible polyamide-containing coextrusion.

Referring to the drawing there is illustrated a multilayer film assembly that is suitable for the fabrication of a register printed, thermoformable package. A biaxially oriented polyester (OPET) layer 16 is printed with suitable ink 15. An example of a preferred biaxially oriented polyester film is MYLAR® 75 P25T available from DuPont Teijin Films. A suitable ink is represented by the Color Converting Industries' trade name AXL®.

In a manufacturing operation separate from the printing step described immediately above, a multilayer coextruded film is prepared. A preferred multilayer film coextrusion has at its core an ethylene vinyl alcohol copolymer (EVOH) barrier layer 11. An example of the barrier layer core is SOARNOL® ET supplied by Noltex. Disposed on either side of the barrier layer core are layers 10a and 10b comprised of a flexible polyamide. The flexible polyamide is preferably prepared from a blend of 85% by weight of a semicrystalline polyamide and 15% by weight of an amorphous polyamide. An example of a suitable semicrystalline polyamide is a nylon 6 polymer supplied by BASF known as ULTRAMID® B36. A suitable amorphous polyamide is nylon 616T, produced by DuPont as SELAR® PA 3426. Simultaneously extruded with the barrier core layer 11 and the flexible polyamide layers 10a and 10b are tie layers 12a and 12b and polyolefin layers 13a and 13b. Tie layers are used to join flexible polyamide layers 12a and 12b to polyolefin layers 13a and 13b. Appropriate tie layer materials include maleic anhydride-grafted polyolefins, wherein the grafted polyolefins include those based on ethylene vinyl acetate copolymer, polypropylene, low density polyethylene, high density polyethylene and ethylene alpha-olefin copolymers. A commercially available example of a suitable maleic anhydride-grafted polyolefin is supplied by Rohm and Haas as TYMOR®1 N05. In a preferred version, tie layers 12a and 12b are comprised of a blend of 20% by weight of Rohm and Haas TYMOR®1 N05 and 80% by weight of an ethylene alpha-olefin copolymer. One such suitable ethylene alpha-olefin copolymer is ATTANE® 4201 supplied by the Dow Chemical Company. Joined to the tie layers 12a and 12b are polyolefin layers 13a and 13b. The polyolefin layers may be composed of polypropylene, low density polyethylene, high density polyethylene, ethylene alpha-olefin copolymers, ethylene ester copolymers like ethylene vinyl acetate copolymers or ethylene methyl acrylate copolymers, ethylene acid copolymers like ethylene acrylic acid copolymers or ethylene methacrylic acid copolymers, ionomers and the like. An example of suitable polyolefin layers 13a and 13b in this embodiment include those comprised of an ethylene alpha-olefin copolymer like Dow ATTANE® 4201 (ULDPE). Layers 13a and 13b are advantageously modified with an antiblocking agent, slip agents and a processing aid. In this example, a suitable antiblocking agent is supplied as a concentrate of 20% by weight diatomaceous earth in low density polyethylene by Ampacet as grade 10063. This concentrate is added to the Dow ATTANE® 4201 at 3.5% by weight. A suitable slip agent is supplied as a concentrate of 4% erucamide and 2* stearamide in low density polyethylene by Ampacet as grade 10061. This concentrate is added to the Dow ATTANE® 4201 at 2.0% by weight. A suitable processing aid is supplied as a concentrate of 3% of a copolymer of hexafluoropropylene and vinylidene fluoride in linear density polyethylene by Ampacet as grade 10562. This concentrate is added to the Dow ATTANE® 4201 at 0.3%.

Further, to produce the composition given by example in FIG. 1, the printed biaxially oriented polyester film, layers 15 and 16, are joined to the multilayer coextruded film, layers 13b, 12b, 10b, 11, 10a, 12a and 13a by an adhesive layer 14. An appropriate adhesive layer is produced from the combination of an isocyanate-terminated polyester and a polyol. The preferred joining technique is known in the art as dry bond adhesive lamination. An example of an appropriate adhesive is supplied by Rohm and Haas as ADCOTE® 522.

Although we have only illustrated the compositions of layers 13a and 13b as having additives, it is understood that all of the compositions for the various layers can have additives such as slip agents, processing aids, antiblocking agents, antistatic agents, colorants, etc. Also, even as the aforementioned example is an embodiment of the invention, it is important to understand that the intent of the invention is to combine a biaxially oriented film with a flexible polyamide-containing multilayer coextrusion. The important result of this combination is to substantially improve the thermoformability of a register-printed flexible packaging film. Various features of the invention have been particularly shown and described concerning the illustrated embodiment of the invention. However, it must be understood that this particular arrangement does not limit, but merely illustrates, and the invention is to be given its fullest interpretation within the terms of the appended claims.

What is claimed is:

1. A flexible, thermoformable packaging film laminate including:
    an outer layer comprising a biaxially oriented polyester film;
    a layer of ink on a surface of said outer layer;
    an adhesive layer adjacent said layer of ink; and
    a flexible, polyamide containing, coextruded film adhered to said adhesive layer, said flexible, polyamide containing, coextruded film comprising a semi-crystalline polyamide layer and said polyamide containing coextruded film including an exterior polyolefin layer opposite said biaxially oriented polyester film, wherein said polyolefin layer is an exterior surface layer of said laminate.

2. A flexible, thermoformable packaging film laminate as in claim 1 in which said flexible, polyamide containing, coextruded film includes a layer comprising a blend of a semi-crystalline polyamide and an amorphous polyamide.

3. A flexible, thermoformable packaging film laminate as in claim 1 in which said flexible, polyamide containing, coextruded film comprises an oxygen barrier layer sandwiched between a first polyamide layer and a second polyamide layer.

4. A flexible, thermoformable packaging film laminate as in claim 3 in which said oxygen barrier layer is comprised of an ethylene vinyl alcohol copolymer.

5. A flexible, thermoformable packaging film laminate as in claim 1 wherein said flexible polyamide containing coextruded film includes an internal polyolefin layer adhered to said layer of adhesive.

6. A flexible, thermoformable packaging film laminate as in claim 5 wherein said flexible polyamide containing coextruded film includes a first tie layer disposed adjacent said internal polyolefin layer.

7. A flexible, thermoformable packaging film laminate as in claim 6 in which said flexible polyamide containing coextruded film comprises a first polyamide layer adhered to said first tie layer.

8. A flexible, thermoformable packaging film laminate as in claim 7 in which said flexible, polyamide containing, coextruded film includes an oxygen barrier layer adhered to said first polyamide layer.

9. A flexible, thermoformable packaging film laminate as in claim 8 in which said flexible, polyamide containing, coextruded film includes a second polyamide layer adhered to said oxygen barrier layer on the side opposite said first polyamide layer.

10. A flexible, thermoformable packaging film laminate as in claim 9 including a second tie layer adhered to said second polyamide layer.

11. A flexible, thermoformable packaging film laminate having at least three layers comprising:
    an outer layer comprising a biaxially oriented polyester film having an outer surface and an inner surface;
    a layer of ink on a said inner surface of said biaxially oriented polyester film; and,
    a flexible, polyamide containing, coextruded film adhered to said biaxially oriented polyester film, said flexible, polyamide containing, coextruded film comprising a semi-crystalline polyamide layer and an exterior polyolefin layer opposite said biaxially oriented polyester film, wherein said exterior polyolefin layer is an exterior surface layer of said laminate.

12. A flexible, thermoformable packaging film laminate according to claim 11, wherein said layer of ink on said inner surface of said biaxially oriented polyester film comprises printed indicia, and said flexible, polyamide containing, coextruded film is adhered to said printed indicia.

13. A flexible, thermoformable packaging film laminate according to claim 11, wherein said flexible, polyamide containing, coextruded film includes at least one layer comprising a blend of a semi-crystalline polyamide and an amorphous polyamide.

14. A flexible, thermoformable packaging film laminate according to claim 11, wherein said flexible, polyamide containing, coextruded film comprises a three-layer film including a first polyamide layer, a second polyamide layer and an oxygen barrier layer disposed between said first and second polyamide layers.

15. A flexible, thermoformable packaging film laminate comprising:
    an outer layer of biaxially oriented polyester film having an outer surface and an inner surface;
    a layer of ink disposed on said inner surface;
    an adhesive layer positioned to overlie said layer of ink;
    a first polyolefin layer adhered to said adhesive layer;
    a first tie layer adjacent said first polyolefin layer;
    a first polyamide layer adjacent said first tie layer;
    an oxygen barrier layer adjacent said first polyamide layer;

a second polyamide layer adjacent said oxygen barrier layer;

a second tie layer adjacent said second polyamide layer; and, a second polyolefin layer adjacent said second tie layer;

wherein said first polyolefin, said first tie layer, said first polyamide layer, said oxygen barrier layer, said second polyamide layer, said second tie layer and said second polyolefin layer comprise a coextruded film, wherein at least one of said first polyamide layer and second polyamide layer comprises a semicrystalline polyamide layer, and wherein said second polyolefin layer is an exterior surface layer of said laminate.

* * * * *